US009148552B2

United States Patent
Sato et al.

(10) Patent No.: US 9,148,552 B2
(45) Date of Patent: Sep. 29, 2015

(54) IMAGE PROCESSING APPARATUS, IMAGE PICKUP APPARATUS, NON-TRANSITORY STORAGE MEDIUM STORING IMAGE PROCESSING PROGRAM AND IMAGE PROCESSING METHOD

(71) Applicant: CANON KABUSHIKI KAISHA, Tokyo (JP)

(72) Inventors: Arata Sato, Utsunomiya (JP); Koshi Hatakeyama, Tokyo (JP)

(73) Assignee: CANON KABUSHIKI KAISHA (JP)

( * ) Notice: Subject to any disclaimer, the term of this patent is extended or adjusted under 35 U.S.C. 154(b) by 21 days.

(21) Appl. No.: 14/132,141

(22) Filed: Dec. 18, 2013

(65) Prior Publication Data

US 2014/0176768 A1  Jun. 26, 2014

(30) Foreign Application Priority Data

Dec. 20, 2012  (JP) .................................. 2012-277805

(51) Int. Cl.
```
H04N 5/217      (2011.01)
G06T 7/00       (2006.01)
H04N 5/357      (2011.01)
G06T 5/00       (2006.01)
G06T 5/50       (2006.01)
```

(52) U.S. Cl.
CPC .............. *H04N 5/2173* (2013.01); *G06T 5/003* (2013.01); *G06T 5/50* (2013.01); *G06T 7/0002* (2013.01); *H04N 5/3572* (2013.01); *G06T 2207/20221* (2013.01); *G06T 2207/20224* (2013.01); *G06T 2207/30168* (2013.01)

(58) Field of Classification Search
CPC .............. H04N 5/2173; H04N 5/3572; H04N 5/23254; G06T 7/0002; G06T 5/50; G06T 5/003; G06T 2207/20221; G06T 2207/30168; G06T 2007/20224
See application file for complete search history.

(56) References Cited

U.S. PATENT DOCUMENTS

| | | | |
|---|---|---|---|
| 6,778,210 B1 * | 8/2004 | Sugahara et al. | 348/208.4 |
| 9,041,833 B2 * | 5/2015 | Hatakeyama | 348/241 |
| 2008/0137980 A1 * | 6/2008 | Mizuno | 382/255 |
| 2008/0309777 A1 | 12/2008 | Aoyama | |
| 2011/0279699 A1 * | 11/2011 | Matsui | 348/222.1 |
| 2012/0008005 A1 * | 1/2012 | Fukunishi | 348/222.1 |

FOREIGN PATENT DOCUMENTS

| | | | |
|---|---|---|---|
| JP | 2004-145287 A | 5/2004 | |
| JP | 2005-182745 A | 7/2005 | |
| JP | 2011-044825 A | 3/2011 | |
| JP | 2011-187208 A | 9/2011 | |

* cited by examiner

*Primary Examiner* — Luong T Nguyen
(74) *Attorney, Agent, or Firm* — Rossi, Kimms & McDowell LLP

(57) ABSTRACT

The image processing apparatus includes a memory configured to store information on a specific image pickup condition under which a specific blur component is generated in an input image produced by image capturing using an optical system, the specific blur component being caused by the optical system;
an image pickup condition acquirer configured to acquire information on an actual image pickup condition when capturing the input image; and
a processor configured to perform, when the actual image pickup condition coincides with the specific image pickup condition, a blur detection process to detect the specific blur component included in the input image.

16 Claims, 13 Drawing Sheets

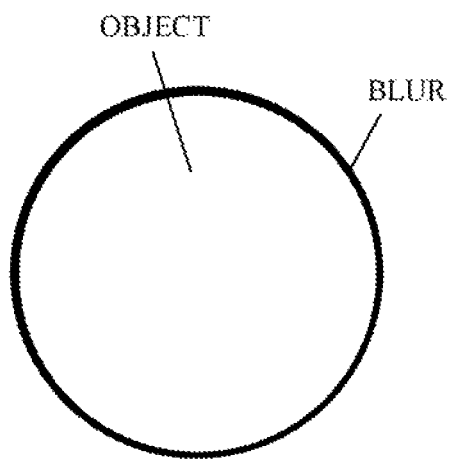
FIG. 8A          FIG. 8B
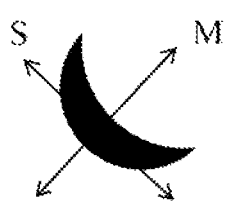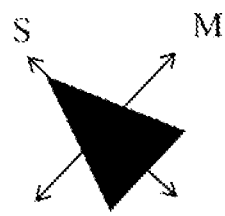
FIG. 9A          FIG. 9B
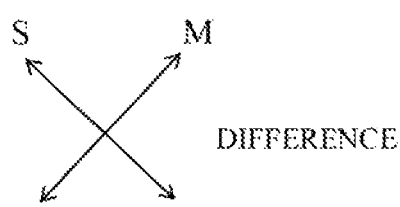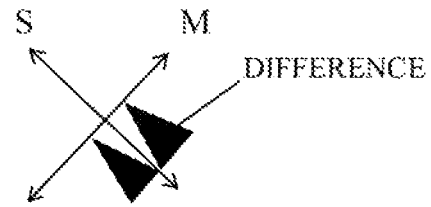
FIG. 9C          FIG. 9D

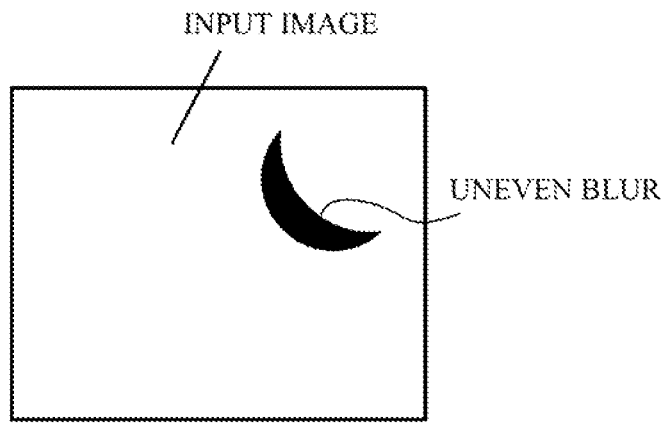
FIG. 10
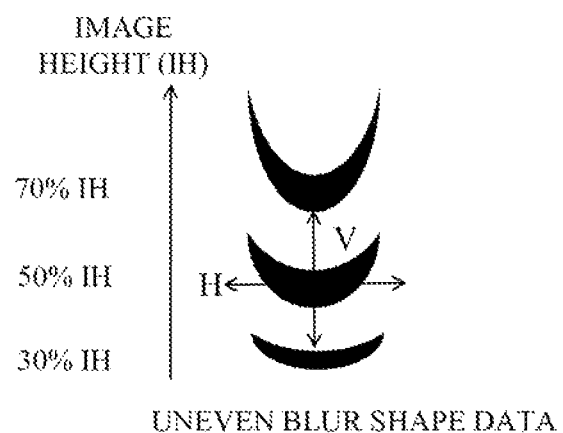
FIG. 11
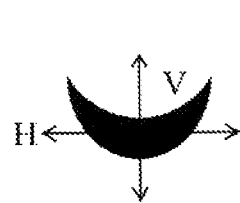 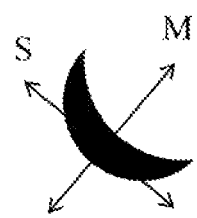
FIG. 12A         FIG. 12B

IMAGE PROCESSING APPARATUS, IMAGE PICKUP APPARATUS, NON-TRANSITORY STORAGE MEDIUM STORING IMAGE PROCESSING PROGRAM AND IMAGE PROCESSING METHOD

BACKGROUND OF THE INVENTION

1. Field of the Invention

The present invention relates to an image processing technique that is performed on an image acquired through image capturing by an image pickup apparatus such as a digital still camera and a video camera.

2. Description of the Related Art

Various electronic image processing techniques that are performed on an image (captured image) acquired by image capturing have been conventionally proposed. For example, Japanese patent Laid-Open No. 2011-187208 discloses an image processing technique of recognizing a face of a person in a captured image to paint or blur other areas than the face, or to clip areas around the face. In addition, Japanese patent Laid-Open No. 2004-145287 discloses an image processing technique of performing determination required for a process using information on a captured image and information on an image pickup condition under which image capturing to acquire the captured image is performed. In addition, Japanese patent Laid-Open No. 2011-44825 discloses an image processing technique of acquiring information on a distance (object distance) to an object included in a captured image and performing an image restoration process thereon using image restoration filters different depending on the object distance.

Captured images acquired by image capturing through an optical system mostly include degradation due to imaging performance (such as aberration and diffraction) of the optical system. In an out-of-focus area including an object like a point light source, an uneven blur (such as a peripheral blur or a highly asymmetric blur), which while be described later, is generated due to the imaging performance. It is desirable that such an uneven blur be removed or reduced by an image process.

However, it is difficult in the image process to accurately distinguish the uneven blur generated in the out-of-focus area caused by the imaging performance of the optical system from an object having an uneven shape. Such difficulty may cause erroneous detection of an area including the uneven-shaped object as an area including the uneven blur and may cause execution of an image process on the erroneously detected area, thereby providing an image different from a desired captured image. None of Japanese patent Laid-Open Nos. 2011-187208, 2004-145287 and 2011-44825 disclose a method of detecting the uneven blur with high accuracy.

BRIEF SUMMARY OF THE INVENTION

The present invention provides as one aspect thereof an image processing apparatus including a memory configured to store information on a specific image pickup condition under which a specific blur component is generated in an input image produced by image capturing using an optical system; the specific blur component being caused by the optical system, an image pickup condition acquirer configured to acquire information on an actual image pickup condition when capturing the input image, and a processor configured to perform, when the actual image pickup condition coincides with the specific image pickup condition, a blur detection process to detect the specific blur component included in the input image.

The present invention provides as another aspect thereof an image pickup apparatus including an image pickup system configured to perform image capturing using an optical system to produce an input image, and the above image processing apparatus.

The present invention provides as another aspect thereof an image processing method including acquiring an input image produced by image capturing using an optical system, providing information on a specific image pickup condition under which a specific blur component is generated in the input image; the specific blur component being caused by the optical system, acquiring information on an actual image pickup condition when capturing the input image, and performing, when the actual image pickup condition coincides with the specific image pickup condition, a blur detection process to detect the specific blur component included in the input image.

The present invention provides as still another aspect thereof a non-transitory storage medium storing an image processing program that causes a computer to perform an image process. The image process includes acquiring an input image produced by image capturing using an optical system, providing information on a specific image pickup condition under which a specific blur component is generated in the input image; the specific blur component being caused by the optical system, acquiring information on an actual image pickup condition when capturing the input image, and performing, when the actual image pickup condition coincides with the specific image pickup condition, a blur detection process to detect the specific blur component included in the input image.

Further features of the present invention will become apparent from the following description of exemplary embodiments (with reference to the attached drawings).

BRIEF DESCRIPTION OF THE DRAWINGS

FIGS. 8A and 8B show an uneven blur detection area in an input image.

FIGS. 9A to 9D show symmetry of the uneven blur in a meridional direction.

FIG. 10 is a view showing an uneven blur included in an input image.

FIG. 11 is a view showing uneven blur shapes to be prepared in advance.

FIGS. 12A and 12B are views showing a method of comparing prepared blur shape data and a detected uneven blur.

DESCRIPTION OF THE EMBODIMENTS

Figure 1A:
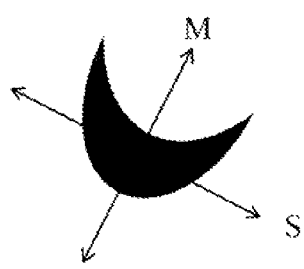
FIGS. 1A to 1I show examples of uneven blurs on which an image processing apparatus (image processing method) that is an embodiment of the present invention performs an image process.

Exemplary embodiments of the present invention will be described below with reference to the accompanied drawings.

First, prior to description of specific embodiments, description will be made of definition of terms to be used in the embodiments.

"Input Image"

The input image is a digital image produced by using an image pickup signal obtained by photoelectric conversion of an object image by an image sensor (image pickup element) such as a CCD sensor or a CMOS sensor; the object image is formed by an image capturing optical system provided to an image pickup apparatus such as a digital still camera or a video camera. The input image is degraded due to aberrations of the image capturing optical system including lenses and various optical filters, that is, an optical transfer function (OTF) of the image capturing optical system. The optical system may be constituted by, other than the lenses, reflective surfaces such as mirrors each having curvature.

The input image has information on color components such as RGB components. The color components can be also expressed by, other than the RGB, a selected one of general color spaces such as LCH (lightness, chroma and hue), YCbCr, color difference signal, XYZ, Lab, Yuv and JCh, or can be expressed by color temperature.

Moreover, the input image can be provided with information on an image pickup condition including a focal length of the image capturing optical system, an aperture value (F-number) thereof, an image pickup distance (object distance) and the like, and with various correction information to be used for correction of the input image. When performing the correction of the input image in an image processing apparatus that receives the input image from the image pickup apparatus, it is desirable to add the image pickup condition information and the correction information as additional information to the input image.

[Uneven Blur]

In the embodiments, an unevenly blurred image generated in an out-of-focus area due to imaging performance of the image capturing optical system is referred to as "an uneven blur". An image component included in an input image by photoelectric conversion of the uneven blur by the image sensor is referred to as "an uneven blur component" which is a specific blur component. In the description hereinafter, the uneven blur component is also simply referred to as "an uneven blur".

The uneven blur will be described in detail with reference to FIGS. 1A to 1I. For example, in a case where an uneven blur shown in FIG. 1A exists in the input image, a length a of the uneven blur in a long axis direction and a length b thereof in a short axis direction are calculated. The long axis direction is a direction corresponding to a longer one of lengths of the blur in a meridional direction represented by M in the figures and in a sagittal direction represented by S therein. The short axis direction is a direction corresponding to a shorter one of the lengths the blur in the meridional direction and in the sagittal direction. In addition, the meridional direction is a direction connecting a center of the input image and a centroid of the uneven blur, and the sagittal direction is a direction perpendicular to the meridional direction.

Figure 1B:
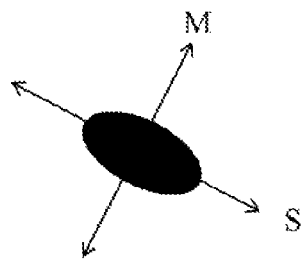
Figure 1C:
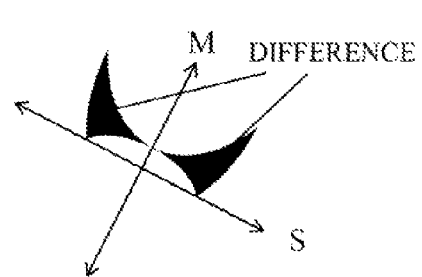

Next, as shown in FIG. 1B, an ellipse is drawn whose center is at the centroid of the uneven blur and which has a long axis having a length of a and a short axis having a length of b. Then, as shown in FIG. 1C, a difference in area between the ellipse shown in FIG. 1B and the uneven blur shown in FIG. 1A is calculated.

As another calculation, in the meridional and sagittal directions, a length A of each pixel of a blur in the long axis direction and a length B of the pixel thereof in the short axis direction are calculated. A maximum value of the lengths A is denoted by Amax, and a maximum value of the lengths B is denoted by Bmax. Next, an ellipse is drawn whose center is at a centroid of the blur and which has a long axis having a length of Amax and a short axis having a length of Bmax. Then, a difference in area between the ellipse and the blur is calculated.

Whether a blur is uneven or even can be defined by whether or not a viewer seeing the blur feels unnaturalness. For example, a blur having, as the above-mentioned difference in area, a difference of 10% or more with respect to that of the ellipse may be defined as the uneven blur. Namely, a blur having a difference lower than 10% with respect to that of the ellipse may be defined as the even blur. For another example, a blur having, as the above-mentioned difference in area, a difference of 20% or more or 30% or more with respect to that of the ellipse may be defined as the uneven blur, and a blur having a difference lower than 20% or 30% with respect to that of the ellipse may be defined as the even blur.

Next, the calculation of the area of the blur will be described. For example, in a case where a luminance signal is stored as an 8-bit signal, a value of the luminance signal (luminance signal value) is in a range of 0 to 255. A threshold value may be set to integrate number of pixels exceeding the threshold value and regard the integrated pixel number as the area of the blur. As the threshold value, an intermediate luminance signal value between 0 and 255 may be employed in consideration of a necessity of removing an influence of noise or consideration of existence of an invisible blur in a luminance saturated pixel.

In addition, determination of a pixel region (uneven blur region) where the uneven blur is generated will be described. Similarly to the area of the blur, in the determination, in order to avoid the influence of noise, a threshold value is set to be larger than 0. For example, in the case where the luminance signal is stored as an 8-bit signal, a region where the luminance signal value is 30 or more may be regarded as an uneven blur area.

Figure 1D:
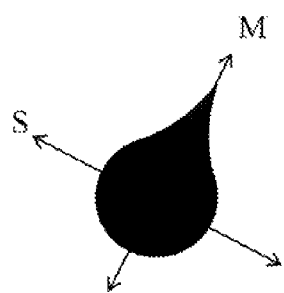
Figure 1E:
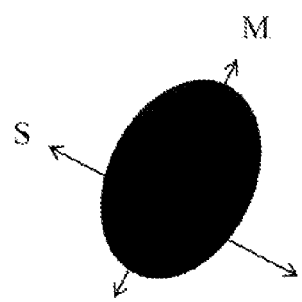
Figure 1F:
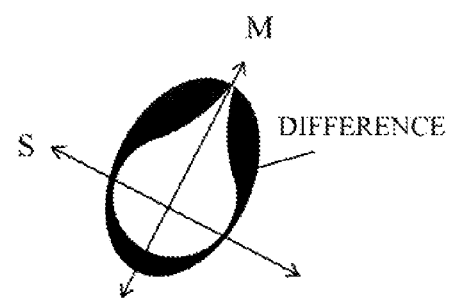
Figure 1G:
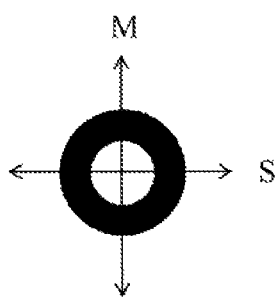
Figure 1H:
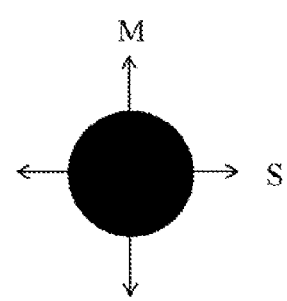
Figure 1I:
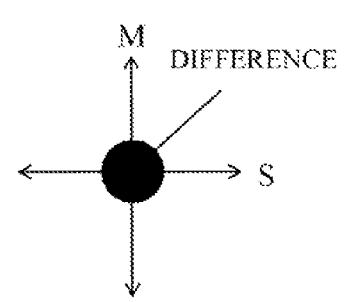

Blurs shown in FIGS. 1D and 1G are also uneven blurs. The uneven blur shown in FIG. 1A includes the ellipse shown in FIG. 1B. However, the uneven blur may be a blur like one shown in FIG. 1D encompassed by an ellipse shown in FIG. 1E. The difference in area in this case is shown in FIG. 1F. In addition, as shown in FIG. 1G, a blur having a ring shape due to diffraction is also an uneven blur. The blur is included in an ellipse shown in FIG. 1H. The difference in area in this case is shown in FIG. 1I.

In addition, a blur having a shape other than the shapes of the blurs shown in FIGS. 1A, 1D and 1G is also an uneven blur; for example, a blur formed by adding, to a blur caused by diffraction shown in FIG. 1G, the blur caused by aberration shown in FIG. 1A or 1D is also an uneven blur. Namely, as long as a blur satisfies a condition for an uneven blur, the blur is treated as an uneven blur irrespective of its shape. For example, in a case where one of the meridional and sagittal directions which corresponds to a longer one of lengths of a blur is defined as a long axis direction, and the other which corresponds to a shorter one of the lengths is defined as a short axis direction, the condition necessary for uneven blurs may be that a blur has a length of 1.3 times or more in the long axis direction than that in the short axis direction.

Figure 2:
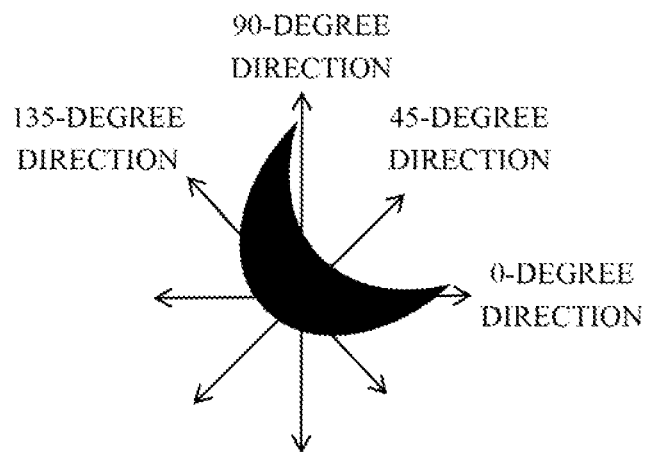
FIG. 2 shows the uneven blur.

In addition, as shown in FIG. 2, a condition for an uneven blur may be that a ratio of a maximum one among detected lengths in four directions (0-degree, 45-degree, 90-degree and 135-degree directions) of a blur to a minimum one thereamong is 1.3 or more.

[Specific Object Distance Range]

Figure 3:
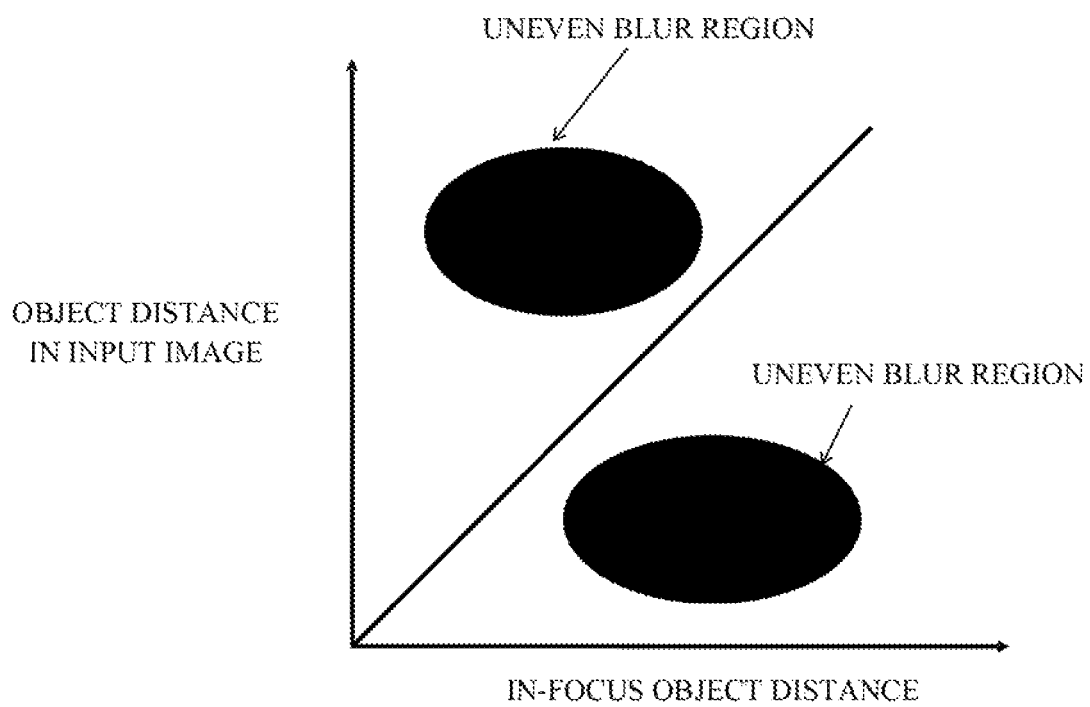
FIG. 3 shows areas where the uneven blur ids generated.

In the embodiments, an object distance range where an uneven blur detection process is performed is referred to as "a specific object distance range". FIG. 3 shows an object distance range where an uneven blur is generated. In FIG. 3, a vertical axis denotes an object distance to an object in a captured image (input image), and a horizontal axis denotes an object distance (in-focus object distance) where an image capturing optical system is focused on. In a case of image capturing of a non-planar object, a captured image includes multiple objects located at different object distances. Of the different object distances, an object distance of the object on which the image capturing optical system is focused is the in-focus object distance. An image region including the object located at the in-focus object distance in the input image is an in-focus image region. Black regions in FIG. 3 each show the in-focus object distance. An object distance range outside the in-focus object distance range is an out-of-focus object distance range. An image region corresponding to the out-of-focus object distance range is an out-of-focus image region. The uneven blur detection process is performed on, of the out-of-focus image region, a region where an uneven blur is generated, that is, a region corresponding to a specific object distance range; the region (and the specific object distance range) is decided on a basis of parameter information showing an image pickup condition. The parameter information (that is, the image pickup condition information) is hereinafter referred to as "image pickup condition parameter information."

Next, description will be made of basic contents of the uneven blur detection process (image processing method) performed in the embodiments described later with reference to a flowchart shown in FIG. 4. The process is executed by a computer according to an image processing program as a computer program.

At step S101, the computer starts the process in response to a user's half press (shutter ON) of a shutter button provided in an image pickup apparatus in a state where the image capturing optical system of the image pickup apparatus is focused on an object.

At step S102, the computer acquires image pickup condition parameter information when capturing an input image. The mage pickup condition parameter information when capturing the input image is referred to as "actual image pickup condition parameter information (actual image pickup condition information)." The image pickup condition parameter information includes, for example, a focal length and an F-number (Fno) of the image capturing optical system, and an image pickup distance (in-focus object distance). For example, in a case where the focal length is short and the image capturing optical system is in a pan-focus state, an uneven blur is hardly generated. In addition, in response to change of the F-number, a shape of an uneven blur is changed due to an influence of diffraction. Furthermore, in response to change of the image pickup distance, the object distance where the uneven blur is generated is changed. The actual image pickup condition parameter information may be acquired before or after a press of the shutter button. Digital cameras includes one which perform a focusing operation in response to a half press of its shutter button and then performs image capturing (image capturing operation) in response to a full press of the shutter button. In such a digital camera, since the image pickup condition is fixed in response to the half press of the shutter button, the image pickup condition parameter information may be acquired at the time of the half press of the shutter button.

Next, at step S103, the computer determines whether or not the image pickup condition parameter information when capturing the input image coincides with the specific image pickup condition parameter information provided in advance in a database as parameter information showing the image pickup conditions where the uneven blur is generated.

Figure 5:
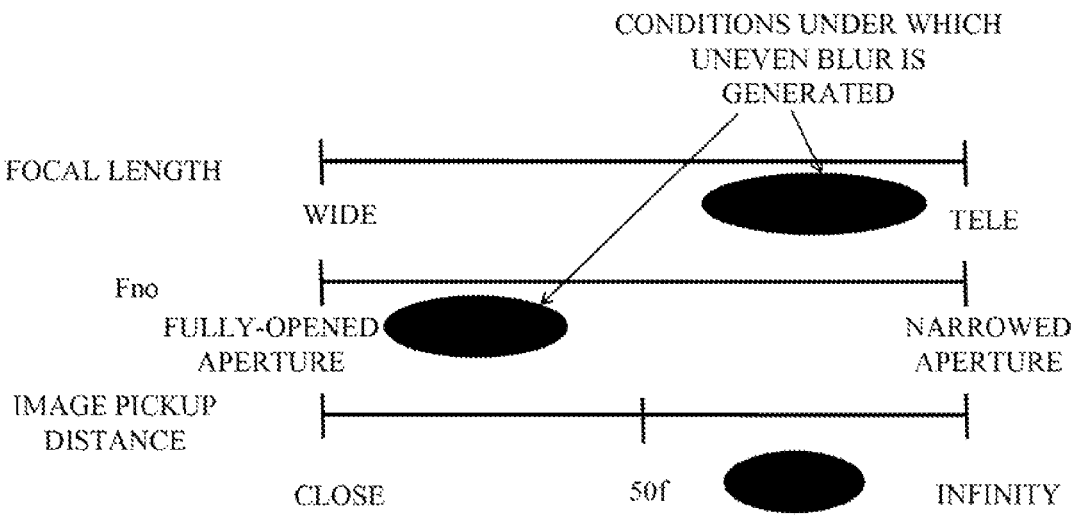
FIG. 5 shows an example of determination using an image pickup condition.

Description will here be made of the determination of coincidence of the specific image pickup condition parameter information with the actual image pickup condition parameter information, that is, an uneven blur generation determination with reference to FIG. 5 and Table 1. As described above, the image pickup condition parameter information includes the focal length and the F-number (Fno) of the image capturing optical system, and the image pickup distance.

As for the focal length, at focal lengths on a wide-angle side and near a telephoto end, the uneven blur is less likely to be noticeable; and however, at a middle focal length, the uneven blur is likely to be noticeable. The reasons for them are as follows. On the wide-angle side, the image capturing optical system becomes a pan-focus state where the entire captured image becomes the in-focus image region, so that the uneven blur which is generated in the out-of-focus image region is less likely to be noticeable. In addition, near the telephoto end, a depth of field of the image capturing optical system is shallow and thereby change of the object distance directly increases the blur, so that the uneven blur is less likely to be noticeable. In contrast, at the middle focal length, the image capturing optical system does not become the pan focus state and the change of the object distance does not largely increase the blur as compared with near the telephoto end, so that the uneven blur is likely to be noticeable.

Although increasing the F-number generates a ring-shaped blur due to the influence of the diffraction, an influence of the aberration is reduced, so that an odd shape of the blur is less likely to be noticeable. In a case where the image pickup distance is a close distance, as compared with a case of focusing on infinity, the imaging performance is generally deteriorated, so that the uneven blur is less likely to be noticeable. In this manner, since a generation degree (noticeable degree) of the uneven blur is changed depending on the image pickup condition such as the focal length, the F-number and the image pickup distance, using the image pickup condition parameter information in the uneven blur generation determination makes it possible to reduce erroneous detections. The uneven blur generation determination may be made by, for example, a method shown in Table 1. That is, the determination may be performed by providing in advance a data table storing presence (○) or absence (x) of the generation of the uneven blur for each focal length, each F-number and each image pickup distance and by comparing the actual image pickup condition with the data table. In a case where the actual image pickup condition is not a value stored in the data table but an intermediate value between the stored values, the stored value closest to the intermediate value in the data table may be used. For example, in Table 1, when the image pickup distance is 5 m, the determination result of the data table for the image pickup distance of 3 m may be used. When the image pickup distance is 8 m, the determination result of the data table for the image pickup distance of 10 m may be used. This also applies to other image pickup condition parameters.

Figure 6:
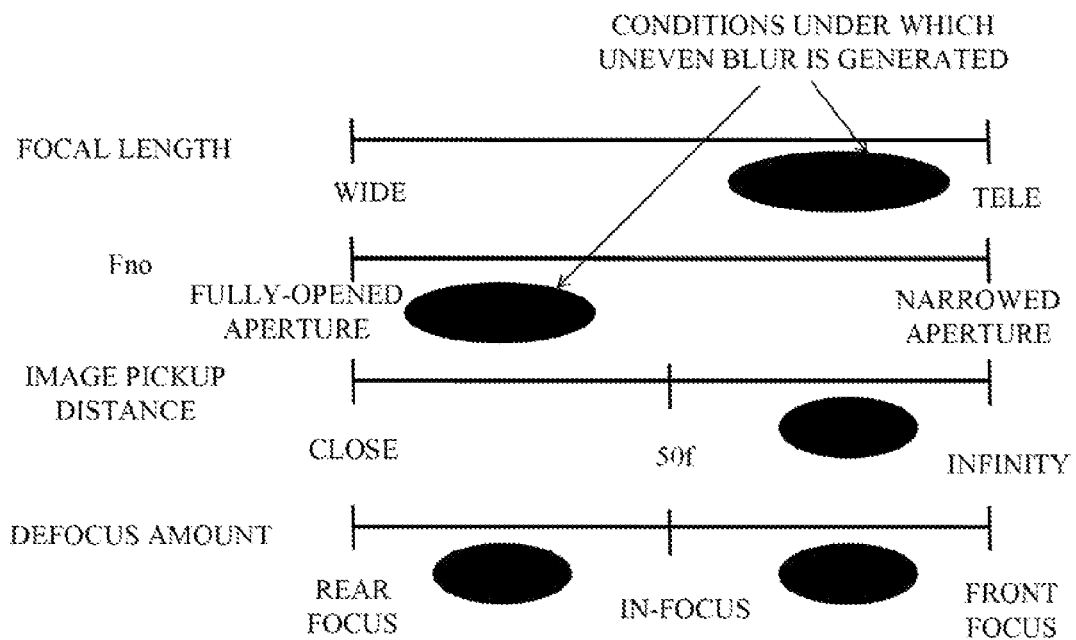
FIG. 6 shows another example of determination using an image pickup condition.

In addition, as shown in FIG. 6 and Table 2, the image pickup condition parameter information may include a defocus amount of the image capturing optical system. Using the defocus amount makes it possible to further improve detection accuracy of the uneven blur.

In a case where the actual image pickup condition parameter information does not coincide with the specific image pickup condition parameter information, the computer does not perform the uneven blur detection process. On the other hand, in a case where the actual image pickup condition parameter information coincides with the specific image pickup condition parameter information, the computer acquires a distance map described later at step S104 and then performs the uneven blur detection process.

The distance map is a data map showing information on the object distance in each of multiple image regions set by dividing the input image (that is, information on an object distance distribution in the input image). An exemplary method of acquiring the distance map is by performing image capturing multiple times with mutually different in-focus object distances to acquire multiple images and then extracting the in-focus image region from each of the multiple images. This method makes it possible to provide the distance map showing the object distance in each of the divided image regions in the input image. In addition, another exemplary method of acquiring the distance map is by performing image capturing multiple times with mutually different F-numbers to acquire multiple images and then extracting the in-focus image region from each of the multiple images. Since change of the F-number changes the depth of field and further changes the in-focus image region, acquiring the object distance including the depth of field (that is, the in-focus object distance) for each F-number can provide the distance map.

A more detailed description will be made of the method of acquiring the distance map by changing the F-number with reference to FIGS. 7A to 7C. The following description will be made of a case where the object to be focused on is exists at a center of the input image (captured image).

Figure 7A:
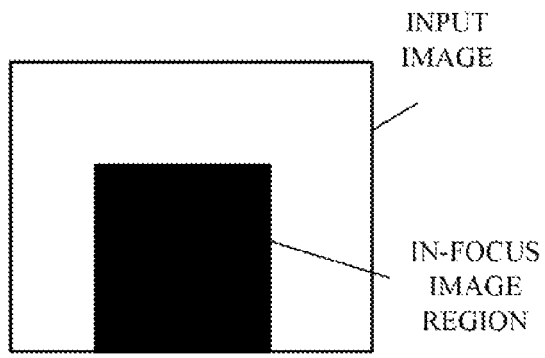
FIGS. 7A to 7C show distance maps.

FIG. 7A shows a fully opened aperture state; a black region in the figure shows an image region (in-focus image region) on which the image capturing optical system is focused. FIG. 7B shows a one-step narrowed aperture state narrowed by one step from the fully opened aperture state. FIG. 7C shows a difference between the in-focus image regions in the states shown in FIGS. 7A and 7B. Calculating the depth of field from the image pickup distance, the F-number and the focal length makes it possible to calculate a distance (in-focus object distance) to the object on which the image capturing optical system is focused.

Figure 7B:
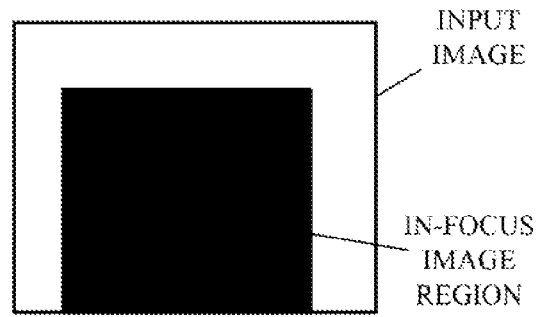
Figure 7C:
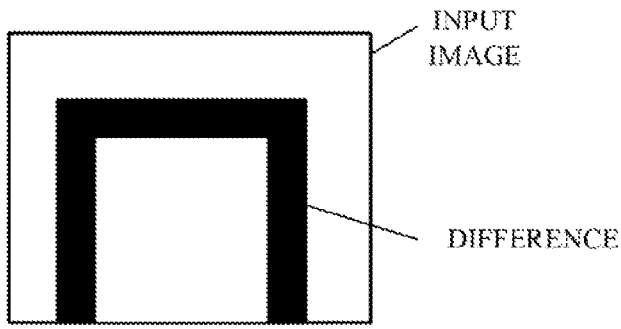

For example, in a case where the in-focus object distance range corresponding to the in-focus image region shown in FIG. 7A is from 2 m to 4 m, the in-focus object distance range shown in FIG. 7B is from 2 m to 10 m, which is wider than that of FIG. 7A. Thus, an object distance from 4 m to 10 m corresponding to a remaining (difference) image region obtained by subtracting the in-focus image region shown in FIG. 7A from the in-focus image region shown in FIG. 7B is an in-focus object distance uniquely corresponding to the one step narrowed aperture state. Such a method makes it possible to acquire the object distance for each image region and thereby acquire the distance map. The F-number can be changed in finer step increments (such as in 0.5 step increments) than in one step increments, which enables improvement of accuracy of the distance map.

Still another method of acquiring the distance map is by dividing a pupil of the image capturing optical system into multiple divided pupil regions and performing a focusing operation with a phase difference detection method using light fluxes from the divided pupil regions to calculate the object distance in each of the divided image regions. The division of the pupil (pupil division) can be performed by arranging microlenses for pixels of an image sensor or dividing one pixel into multiple pixels. Yet another method of acquiring the distance map is by dividing the pupil of the image capturing optical system and thereby acquiring parallax images to calculate the object distance in each of the image regions (pixels) from the parallax images.

The distance map may be acquired at any time after the shutter button is pressed until the uneven blur detection process is started. Acquiring the distance map and providing the defocus amount as the image pickup condition parameter information makes it possible to improve the detection accuracy of the uneven blur.

For example, in a case where the distance map is acquired before the uneven blur generation determination, the distance map is acquired at image capturing of all the input images. In this case, although a processing load for acquiring the distance map increases, the distance map can be acquired for all the input images, so that a freedom degree of processing in subsequent processes increases. For example, in a case where an image restoration process using an image restoration filter is performed as the subsequent process, the image restoration filter may be changed on a basis of information obtainable from the distance map. On the other hand, in a case where the distance map is acquired after the uneven blur generation determination, the distance map is necessary to be acquired for only the input image captured under the image pickup condition under which the uneven blur is generated. Accordingly, the processing load for acquiring the distance map is suppressed as small as possible.

Figure 4:
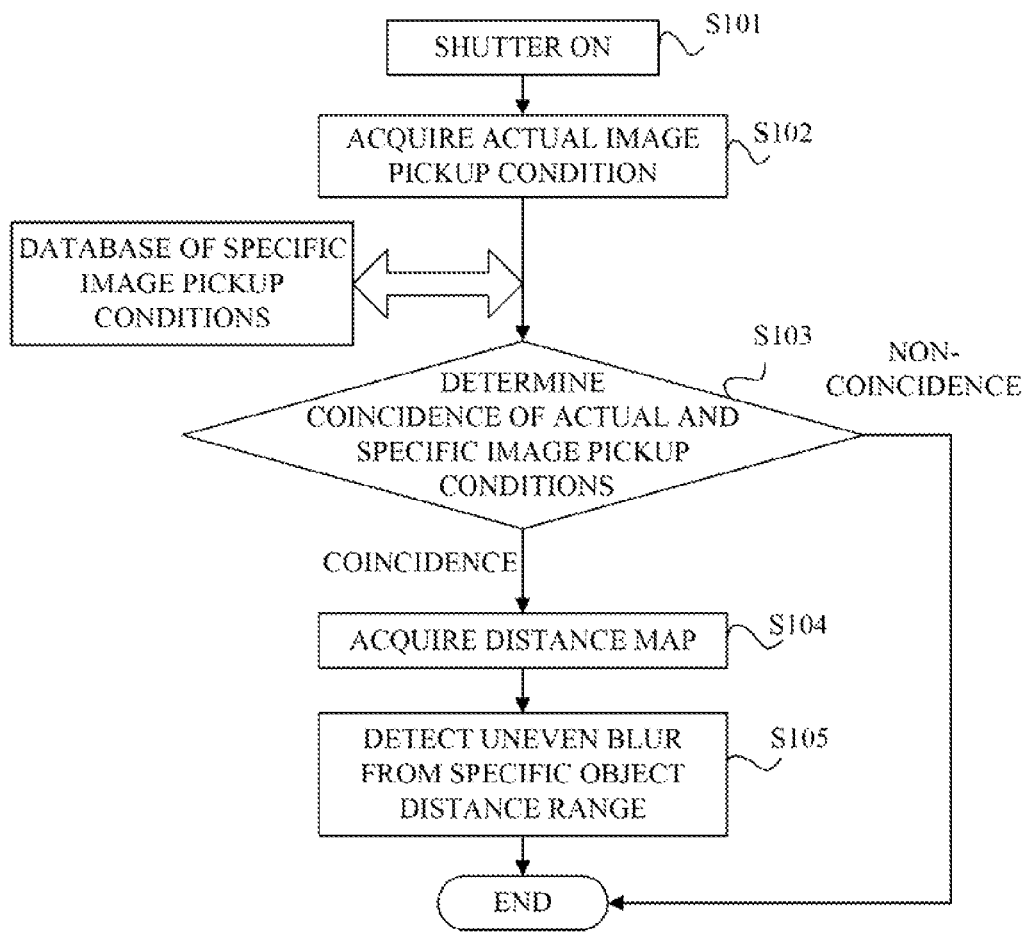
FIG. 4 is a flowchart showing processes common to embodiments of the present invention.

After the above-described preparation processes, at step S105 shown in FIG. 4, the computer performs the uneven blur detection process to detect the uneven blur in the specific object distance range. In the uneven blur detection process, the computer may refer to the image pickup condition parameter information. For example, the computer may refer to the defocus amount obtained from the distance map included in the image pickup condition parameter information to decide the specific object distance range. For example, a significantly large defocus amount makes a captured image a largely out-of-focus image and therefore makes it impossible to determine whether a blur included in the captured image is a blur of an object image or an uneven blur. In this case, the uneven blur cannot be distinguished from background. On the other hand, a significantly small defocus amount is provided in a state where an imaging performance near an in-focus state is provided; the uneven blur is less likely to be generated in this state. Therefore, referring to the defocus amount can increase a possibility of reliably performing detection of the uneven blur, which results in improvement of the detection accuracy of the uneven blur.

The image pickup condition parameter information may include the object distance where the uneven blur is generated in addition to the focal length, the F-number and the image pickup distance. The computer may decide the specific object distance range by referring to the object distance.

A detailed description will hereinafter be made of the uneven blur detection process. Performing the uneven blur detection process on the entire input image by using an image processing filter increases a processing load. Therefore, in the embodiment, as described above, the computer determines in advance the presence or absence of generation of the uneven blur on the basis of the image pickup condition parameter information and performs the uneven blur detection process when a determination that the uneven blur is generated is made. Moreover, the computer performs the uneven blur detection process in an image region where the uneven blur is highly likely to be generated, which reduces the processing load.

It is desirable for detection of the uneven blur to use a filter having C×C pixels (filter cells) satisfying the following condition, that is, to perform the uneven blue detection process in an image region including the C×C pixels in the input image because the detection accuracy of the uneven blur and the processing load can be balanced.

$$1 < C < \text{def}/P \qquad (1)$$

where def represents the defocus amount (of the image capturing optical system), and P represents a pixel pitch (of the image sensor). The image region including the C×C pixels is hereinafter referred to as "an uneven blur detection region."

The uneven blur detection region will be described with reference to FIGS. 8A and 8B. As described above, the uneven blur is generated due to the imaging performance (aberration, diffraction or the like) of the image capturing optical system. When an object is sufficiently larger in size than an amount of the aberration, as shown in FIG. 8A, the uneven blur is not noticeable. As a threshold value of the object size, for example, C defined by condition (1) may be used. On the other hand, as the object size becomes smaller to be close to one pixel, the uneven blur becomes more noticeable as shown in FIG. 8B.

For example, in a case where image capturing is performed by using a 1/2.3-inch image sensor having a size of 4.65 mm×6.2 mm and a pixel pitch of 1.4 μm, a defocus amount of 0.1 mm, an upper limit of C is 71 pixels. A total number of pixels of the input image acquired by the image sensor becomes 4428×3321. For example, even though an object having a size of 1000×1000 pixels exists in the out-of-focus image region of the input image, the uneven blur is unnoticeable.

Condition (1) has a lower limit of 1 (pixel). Even though the uneven blur is generated, when its region is smaller than one pixel, signal intensities in the one pixel are integrated, so that the uneven blur is unnoticeable. Setting such a lower limit enables further reducing the processing load.

Moreover, it is desirable for the uneven blur detection to utilize that the uneven blur has a shape symmetric in the meridional direction with respect to the axis of symmetry extending in the sagittal direction. The utilization of the symmetric shape of the uneven blur will be described with reference to FIGS. 9A to 9D.

As shown in FIG. 9A, in a case where the image capturing optical system is rotationally symmetric with respect to its optical axis, the uneven blur generated due to the imaging performance of the image capturing optical system has a shape symmetric in the meridional direction M with respect to the axis of symmetry extending in the sagittal direction S. On the other hand, as shown in FIG. 9B, an object having an uneven shape, which is not an uneven blur, does not have a shape symmetric in the meridional direction. Thus, as shown in FIGS. 9C and 9D, the uneven blur detection can be made by folding an image region where the uneven blur is to be detected in the meridional direction; by taking differences in signal intensities between the folded image and an unfolded image (original image region); and by determining that the original image region corresponds to the object having an uneven shape if an integrated value of the differences is larger than a threshold value and that the original image region corresponds to the uneven blur caused by the aberration or diffraction of the image capturing optical system if the integrated value is smaller than the threshold value.

Furthermore, the uneven blur detection can be made by providing shape data of the uneven blur (hereinafter referred to as "uneven blur shape data") corresponding to the image pickup conditions and referring to the shape data. When image capturing is performed under the image pickup condition where the uneven blur is generated and the captured image (input image) incidentally includes an object having an uneven shape, performing the uneven blur detection process directly thereon may cause an erroneous detection. Thus, providing the uneven blur shape data in advance and referring thereto enables avoiding the erroneous detection.

For example, in a case where an input image includes an uneven blur as shown in FIG. 10 and the uneven blur shape data are provided for various image pickup conditions and various image heights as shown in FIG. 11, it is desirable to calculate the uneven blur shape data in advance so that the shape has the meridional direction parallel to a long or short side direction of the input image. The uneven blur shape data may be provided for all the image pickup conditions. However, in this case, an amount of the uneven blur shape data becomes very large, and thus a necessary storage capacity is greatly increased. Therefore, it is desirable to provide the uneven blur shape data for only the image pickup conditions under which the uneven blur is generated so as to reduce the amount of the uneven blur shape data.

Furthermore, it is desirable for the uneven blur detection to refer to (a centroid of) the provided uneven blur shape data with rotation thereof about the center of the input image. In other words, as shown in FIGS. 12A and 12B, it is desirable to rotate the provided uneven blur shape data shown in FIG. 11 so that the meridional direction of the uneven blur coincides with that of the uneven blur shape data. In FIGS. 11, 12A and 12B, V denotes a vertical direction, and H denotes a horizontal direction.

Thereafter, the uneven blur detection is performed by matching the rotated uneven blur shape data to the uneven blur shown in FIG. 10. The matching may be performed by using, for example, a method which takes differences in luminance signals between the uneven blur and the uneven blur shape data in the uneven blur detection region and determines that they coincide with each other if an integrated value of the differences in the uneven blur detection region is equal to or less than a predetermined threshold value. Using the rotated uneven blur shape data makes it possible to avoid the erroneous detection of the object having an uneven shape as the uneven blur.

In addition, a size of the uneven blur is changed depending on the size of the object. Therefore, it is desirable for the uneven blur detection to provide the uneven blur shape data including various shape patterns in which the sizes of the uneven blur are mutually different.

Moreover, it is desirable for the uneven blur detection to detect the uneven blur from an image region where an edge cannot be detected by using a differential filter. For example, an image region where the edge can be detected is highly likely to be the in-focus image region, and the uneven blur is less likely to be generated in the in-focus image region. Therefore, performing the uneven blur detection in such an image region where the edge cannot be detected, that is, an image region (out-of-focus image region) outside the in-focus image region makes it possible to improve the detection accuracy of the uneven blur.

Furthermore, the uneven blur detection may be performed by using color information. Specifically, it is desirable to detect pixel signals in multiple color components (for example, RGB channels) and perform the uneven blur detection in one color component having a highest luminance (intensity) thereamong. For example, in a case where a periphery of the uneven blur is a black image region like a case where a night scene including a point light source is captured, since luminance signals of the peripheral image region are close to 0, it is easy to remove the peripheral image region from the uneven blur detection area. However, in a case where a high luminance pixel exists in the peripheral image region, it may be difficult to detect the uneven blur. In such a case, it is desirable to distinguish the image region where the uneven blur is generated from the peripheral image region thereof by using the color component. For example, in a case where a color of an object generating the uneven blur is red, a color of its peripheral image region is gray and luminance signals are detected in the RGB channels generally used in digital cameras and the like, the object provides a highest signal intensity in the R channel. In contrast, the peripheral image region provides approximately equal signal intensities in the RGB channels. Such a difference in color between the object and the peripheral image region facilitates distinguishing the image region where the uneven blur is generated from the peripheral image region thereof.

In addition, it is desirable that the uneven blur detection process be performed on an image region around a luminance saturated pixel in the input image.

After the uneven blur detection process is finished, in order to remove or reduce the uneven blur from the input image, image processes such as a shaping process (blur correction process) and an image restoration process may be performed on the input image.

The shaping process may be performed in order to shape the detected uneven blur into a circular shape by, for example, replacing the detected uneven blur with a circular blur image having a size estimated on a basis of information on the image pickup distance and the F-number. Alternatively, the shaping process may be performed by filling the detected uneven blur with a same luminance signal. In addition, in a case where the uneven blur is included in some of multiple captured images acquired by performing image capturing multiple times, the shaping process may be performed by pasting, in a region where the uneven blur is generated in a captured image including the uneven blur, an image region clipped from a captured image including no uneven blur. Moreover, the shaping process may be performed by a smoothing process to smooth the detected uneven blur. Furthermore, the shaping process may be performed by an edge process or a blurring process.

In addition, although FIG. 4 shows the case of acquiring the distance map, the distance map does not necessarily need to be acquired. In this case, the uneven blur detection process is performed, by regarding the entire input image as the specific object distance range, on the entire input image when the actual image pickup condition parameter information coincides with the specific image pickup condition parameter information. In this case, the detection accuracy of the uneven blur may be deteriorated as compared with the case of using the distance map, but on the other hand, the processing load for acquiring the distance map is reduced.

Moreover, the uneven blur detection process may be performed even when the actual image pickup condition parameter information does not coincide with the specific image pickup condition parameter information, as long as they are close to each other in a predetermined range.

Description will hereinafter be made of the specific embodiments of the present invention.

Embodiment 1

Figure 13:
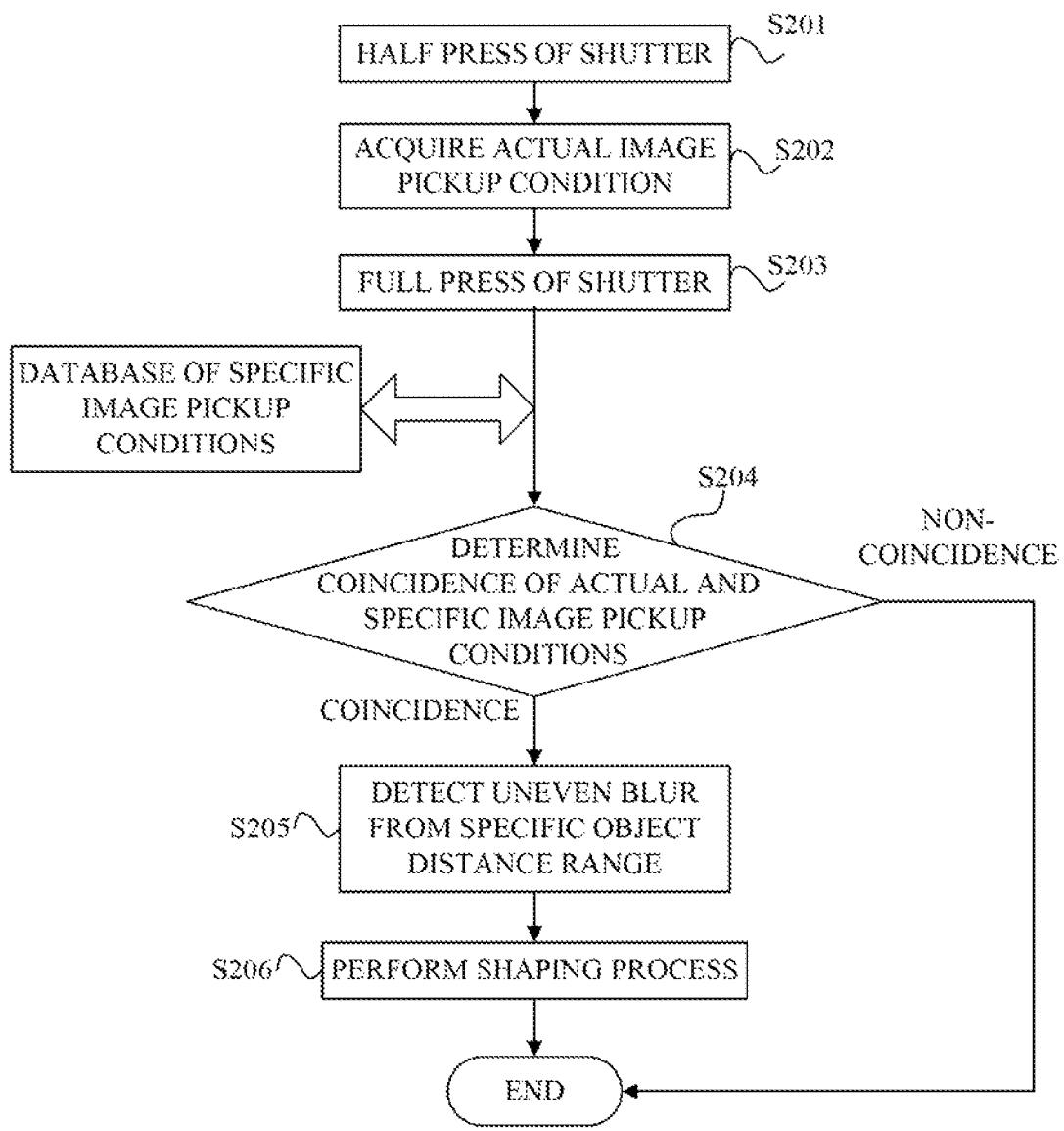
FIG. 13 is a flowchart showing processes of an image processing apparatus according to Embodiment 1 of the present invention.

FIG. 13 is a flowchart showing an image process (image processing method) performed in an image pickup apparatus provided with an image processor (image processing apparatus) that is a first embodiment (Embodiment 1) of the present invention. The image process is executed by a system controller as a main computer of the image pickup apparatus and the image processor as an image processing computer according to an image processing program as a computer program. This also applies to other embodiments described later.

At step S201, the system controller fixes a focus state of an image capturing optical system of the image pickup apparatus in response to a half press of a shutter button. Next, at step S203, the system controller performs image capturing in the fixed focus state in response to a full press of the shutter button to acquire an input image. At step S202 between step S201 and step S203, before performing the image capturing, the image processor acquires the image pickup condition parameter information when capturing the input image (that is, the actual image pickup condition parameter information).

Next, at step S204, the image processor reads out, from a database in a memory, the specific image pickup condition parameter information showing the image pickup condition under which the uneven blur is generated and compares the actual image pickup condition parameter information acquired at step S202 with the specific image pickup condition parameter information. If the actual image pickup condition parameter information does not coincide with (or is not close in a predetermined range to) the specific image pickup condition parameter information, the image processor does not perform the uneven blur detection process and then ends this image process. Since the image processor does not perform the uneven blur detection process, it also does not perform the shaping process.

On the other hand, if the actual image pickup condition parameter information coincides with (or is close in the predetermined range to) the specific image pickup condition parameter information, the image processor perform at step S205 the uneven blur detection process in an image region corresponding to the specific object distance range. However, in this embodiment, the image processor does not acquire the distance map, so that the image processor performs the uneven blur detection process on the entire input image. The image processor instead uses the above-described uneven blur shape data for detecting the uneven blur in the input image so as to improve the detection accuracy of the uneven blur.

Next, at step S206, the image processor performs the shaping process on the detected uneven blur so that the uneven blur becomes unnoticeable.

Figure 14:
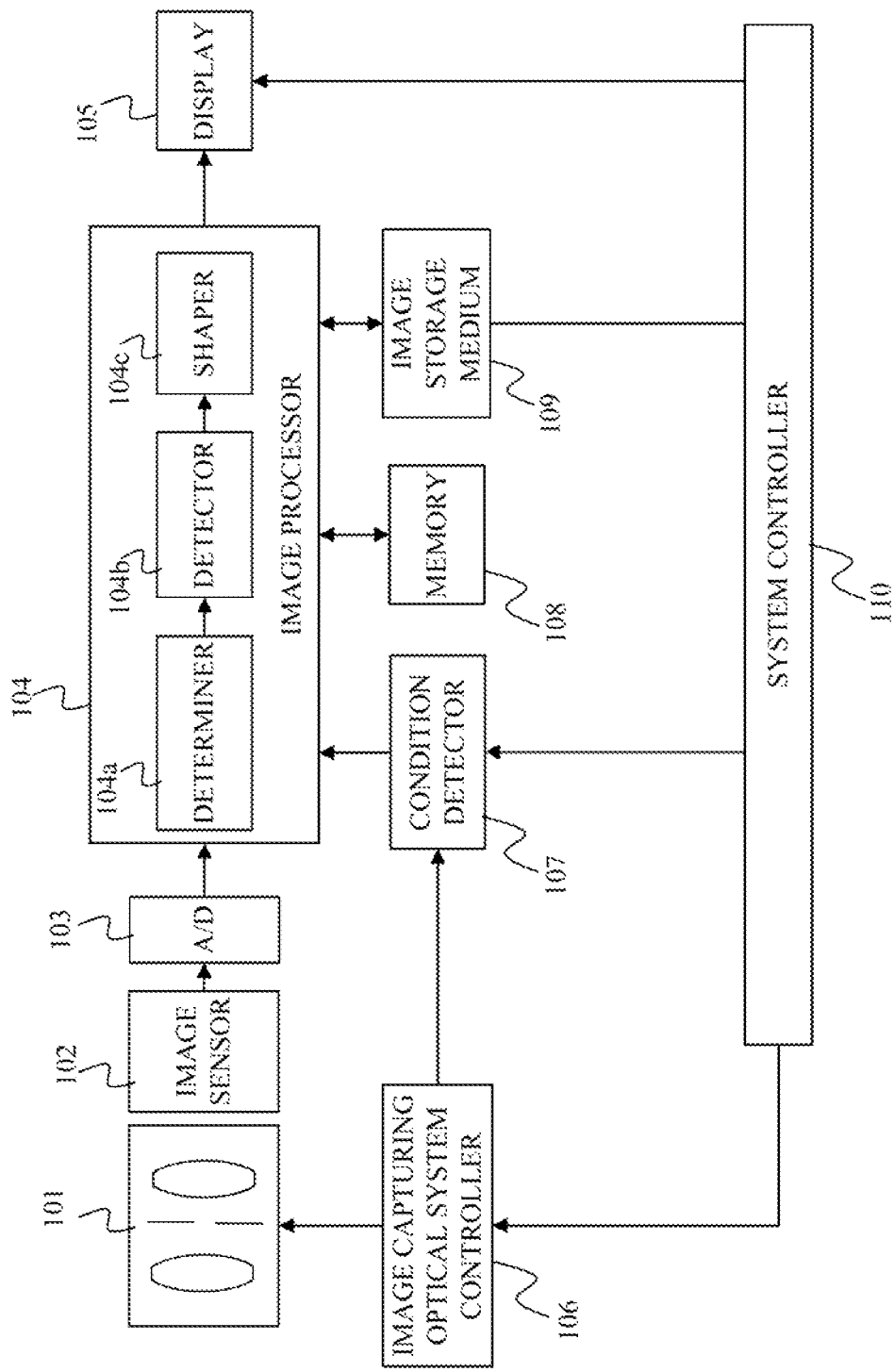
FIG. 14 is a block diagram showing a configuration of the image processing apparatus of Embodiment 1.

FIG. 14 shows a configuration of an image pickup apparatus performing the image process described with reference to FIG. 13. The image pickup apparatus photoelectrically converts an object image formed by an image capturing optical system 101 into an electric signal by an image sensor 102. An A/D converter 103 converts an analog image pickup signal output from the image sensor 102 into a digital image pickup signal. The digital image pickup signal has signal intensities of RGB color components. An image processor 104 performs various processes on the digital image signal to produce an input image as a digital image. The components from the image sensor 102 to the image processor 104 constitute an image pickup system.

The system controller 110 controls a zooming operation, a focusing operation, and an aperture operation of the image capturing optical system 101 through an image capturing optical system controller 106. The image capturing optical system controller 106 sends the actual image pickup condition parameter information to a condition detector 107 as an image pickup condition acquirer.

A memory 108 stores the database of the specific image pickup condition parameter information and sends this parameter information to a determiner 104a in the image processor 104. Although the memory 108 is shown outside the image processor 104, the memory 108 constitutes part of the image processor 104. This applies also to the other embodiments described later. The determiner 104a determines whether or not the actual image pickup condition parameter information received from the condition detector 107 coincides with (or is close in the predetermined range to) the specific image pickup condition parameter information received from the memory 108. When a coincidence determination is made by the determiner 104a, a detector 104b in the image processor 104 performs the uneven blur detection process on the input image. Then, a shaper 104c in the image processor 104 performs the shaping process on the detected uneven blur.

An output image (shaped image or corrected image) resulting from the shaping process is recorded to an image recording medium 109 or displayed on a display device 105 constituted by an LCD or the like.

This embodiment provides the image pickup apparatus as a general compact digital camera including a 1/2.3-inch image sensor (4.65 mm×6.2 mm) as the image sensor 102. In this embodiment, when the image sensor 202 has a pixel pitch of 1.4 μm and the defocus amount is 0.1 mm, the upper limit of C in condition (1) is 71 pixels.

Embodiment 2

Figure 15:
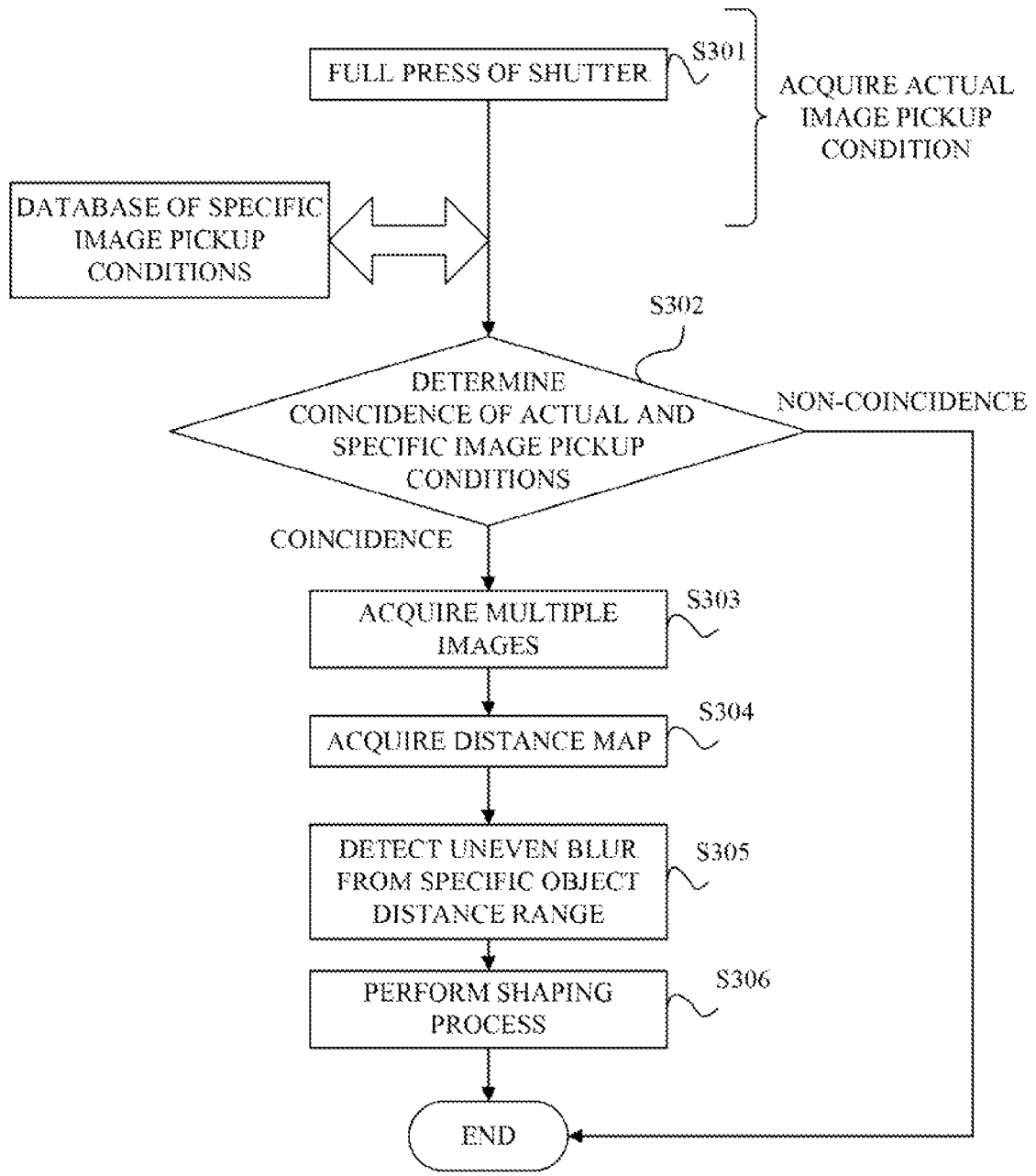
FIG. 15 is a flowchart showing processes of an image processing apparatus that is Embodiment 2 of the present invention.

FIG. 15 is a flowchart showing an image process (image processing method) performed in an image pickup apparatus provided with an image processor (image processing apparatus) that is a second embodiment (Embodiment 2) of the present invention. In this embodiment, at step S301, before or after a full press of a shutter button, the image processor acquires the actual image pickup condition parameter information. Next, at step S302 after the full press of the shutter button (that is, after image capturing), the image processor reads out, from a database in a memory, the specific image pickup condition parameter information and compares the actual image pickup condition parameter information with the specific image pickup condition parameter information. If the actual image pickup condition parameter information does not coincide with (or is not close in a predetermined range to) the specific image pickup condition parameter information, the image processor does not perform the uneven blur detection process and then ends this image process. Since the image processor does not perform the uneven blur detection process, it also does not perform the shaping process.

Figure 16A:
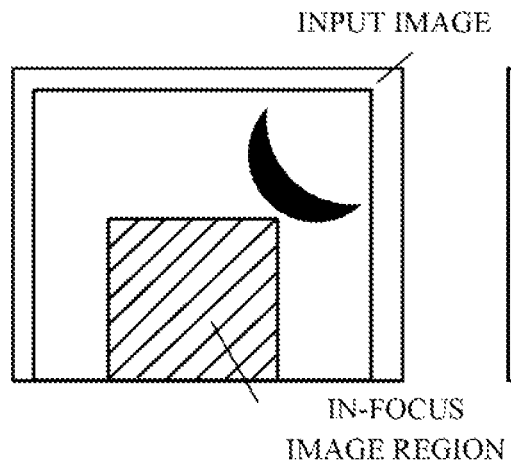
FIGS. 16A to 16C show acquisition of multiple images in Embodiment 2.
Figure 16B:
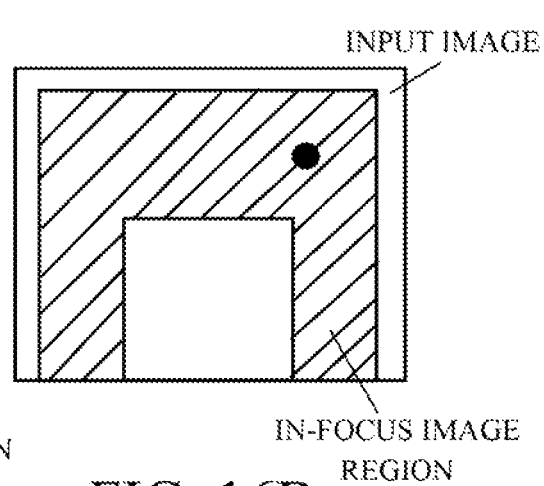
Figure 16C:
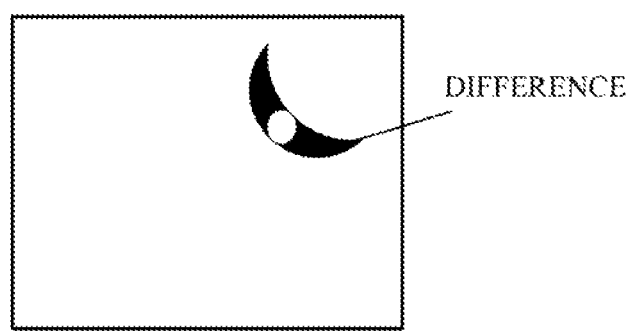

On the other hand, if the actual image pickup condition parameter information coincides with (or is close in the predetermined range to) the specific image pickup condition parameter information, the image processor perform at step S303 image capturing multiple times with changes of a focus position (that is, an in-focus object distance) to acquire multiple images. Through the image capturing, an image focused on an object as an original image capturing target as shown in FIG. 16A and an image focused on the object distance where the uneven blur is generated as shown in FIG. 16B are acquired. The uneven blurs in the two images have significantly different shapes as compared with those of the objects therein. Therefore, taking a difference between the two images as shown in FIG. 16C makes it possible to detect the uneven blur while reducing a possibility of erroneous detection.

Subsequently, at step S304, the image processor acquires the above-described distance map. Next, the image processor performs at step S305 the uneven blur detection process, and then performs at step S306 the shaping process.

Figure 17:
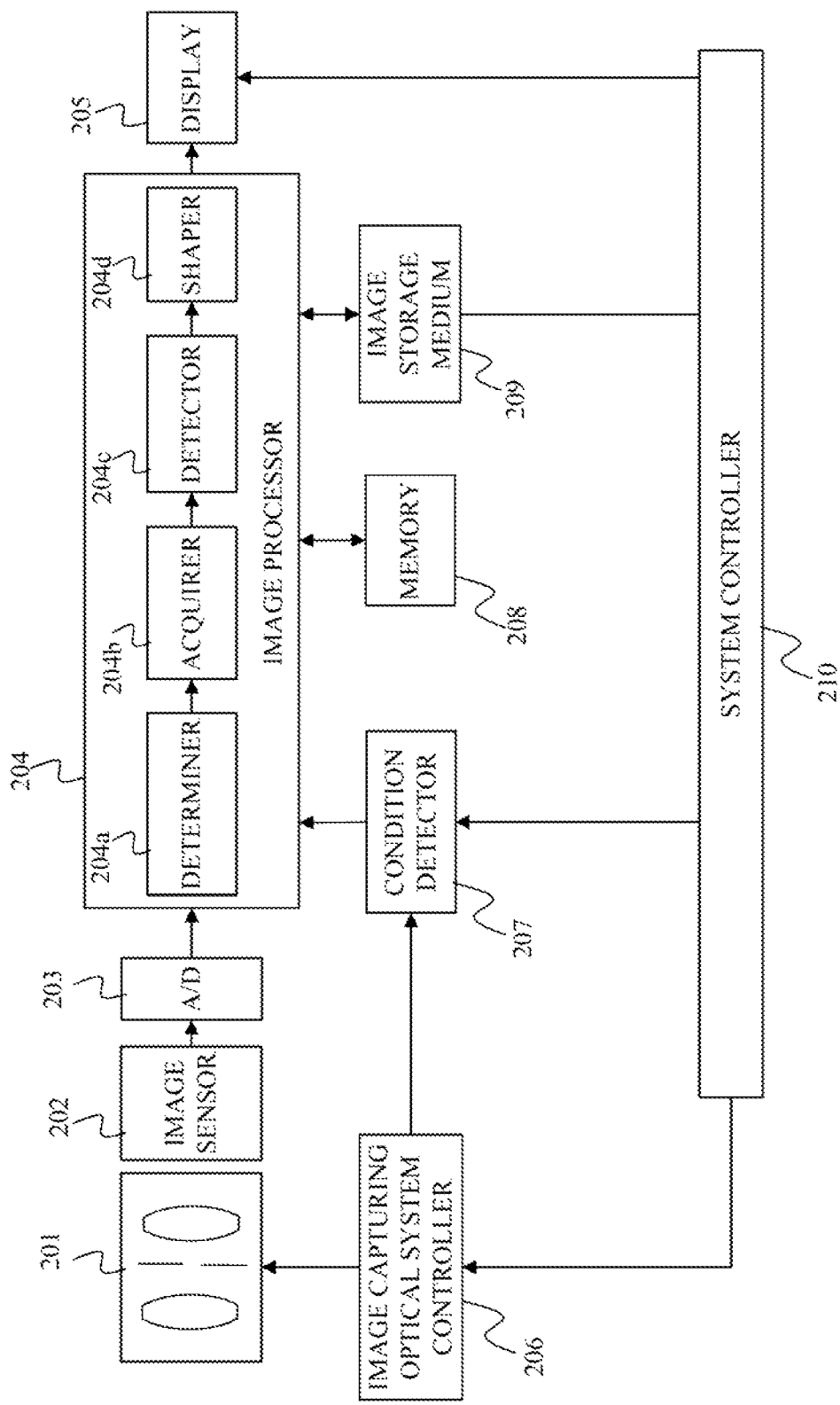
FIG. 17 shows a configuration of the image processing apparatus of Embodiment 2 of the present invention.

FIG. 17 shows a configuration of an image pickup apparatus performing the image process described with reference to FIG. 15. In the image pickup apparatus of this embodiment, components (201 to 203 and 205 to 210) other than an image processor 204 are identical to the components (101 to 103 and 105 to 110) of the image pickup apparatus of Embodiment 1.

A memory 208 sends the specific image pickup condition parameter information to a determiner 204a in the image processor 204. The determiner 204a determines whether or not the actual image pickup condition parameter information received from a condition detector 207 coincides with (or is close in the predetermined range to) the specific image pickup condition parameter information received from the memory 208. When a coincidence determination is made by the determiner 204a, an acquirer 204b in the image processor 204 acquires the distance map, and a detector 204c in the image processor 204 performs the uneven blur detection process on an input image. Then, a shaper 204d in the image processor 204 performs the shaping process on the detected uneven blur.

This embodiment provides the image pickup apparatus as a digital camera including a full-size image sensor (24 mm×36 mm) as an image sensor 202. In this embodiment, when the image sensor 202 has a pixel pitch of 6 μm and the defocus amount is 0.4 mm, the upper limit of C in condition (1) is 67 pixels.

Embodiment 3

Figure 18:
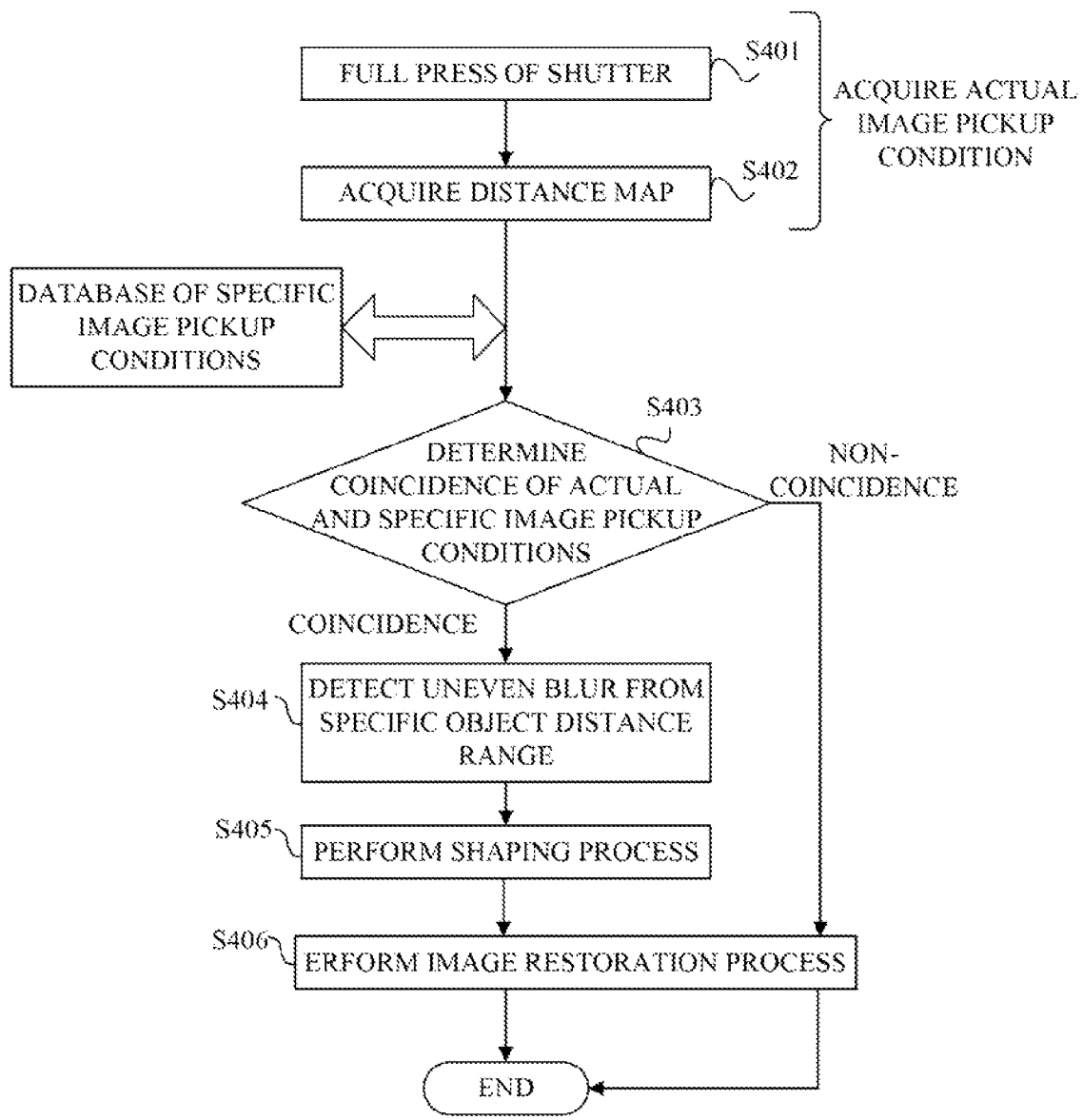
FIG. 18 is a flowchart showing processes of an image processing apparatus that is Embodiment 3 of the present invention.

FIG. 18 is a flowchart showing an image process (image processing method) performed in an image pickup apparatus provided with an image processor (image processing apparatus) that is a third embodiment (Embodiment 3) of the present invention. In this embodiment, at step S401, before or after a full press of a shutter button, the image processor acquires the actual image pickup condition parameter information. Next, at step S402 after the full press of the shutter button (that is, after image capturing), the image processor reads out, from a database in a memory, the specific image pickup condition parameter information and acquires the distance map. Specifically, the image processor acquires the distance map by the above-described pupil division. Then, at step S403, the image processor compares the actual image pickup condition parameter information with the specific image pickup condition parameter information. If the actual image pickup condition parameter information does not coincide with (or is not close in a predetermined range to) the specific image pickup condition parameter information, the image processor does not perform the uneven blur detection process and then ends this image process. Since the image processor does not perform the uneven blur detection process, it also does not perform the shaping process.

On the other hand, if the actual image pickup condition parameter information coincides with (or is close in the predetermined range to) the specific image pickup condition parameter information, the image processor perform at step S404 the uneven blur detection process in an image region corresponding to the specific object distance range. The image processor decides the specific object distance range by referring to the specific image pickup condition parameter information including not only the focal length, F-number and image pickup distance, but also the object distance where the uneven blur is generated under the above parameters. Including the object distance where the uneven blur is generated as part of the specific image pickup condition parameter information increases an amount of data to be treated, but on the other hand, it improves the detection accuracy of the uneven blur. In the uneven blur detection, in order to reduce a possibility of erroneous detection of an object as the uneven blur, a face recognition technique may be used. The face recognition is an image processing technique for detecting a person's face in an image. Treating a face recognition region detected by the face recognition technique as an exceptional region for the uneven blur detection process makes it possible to reduce a possibility of erroneous detection of a person's eye as a blurred image.

Next, at step S405, the image processor performs the shaping process on the detected uneven blur and then performs at step S406 the image restoration process on the shaped image resulting from the shaping process. During the image restoration process, the image restoration filter may be changed by using the acquired distance map.

Figure 19:
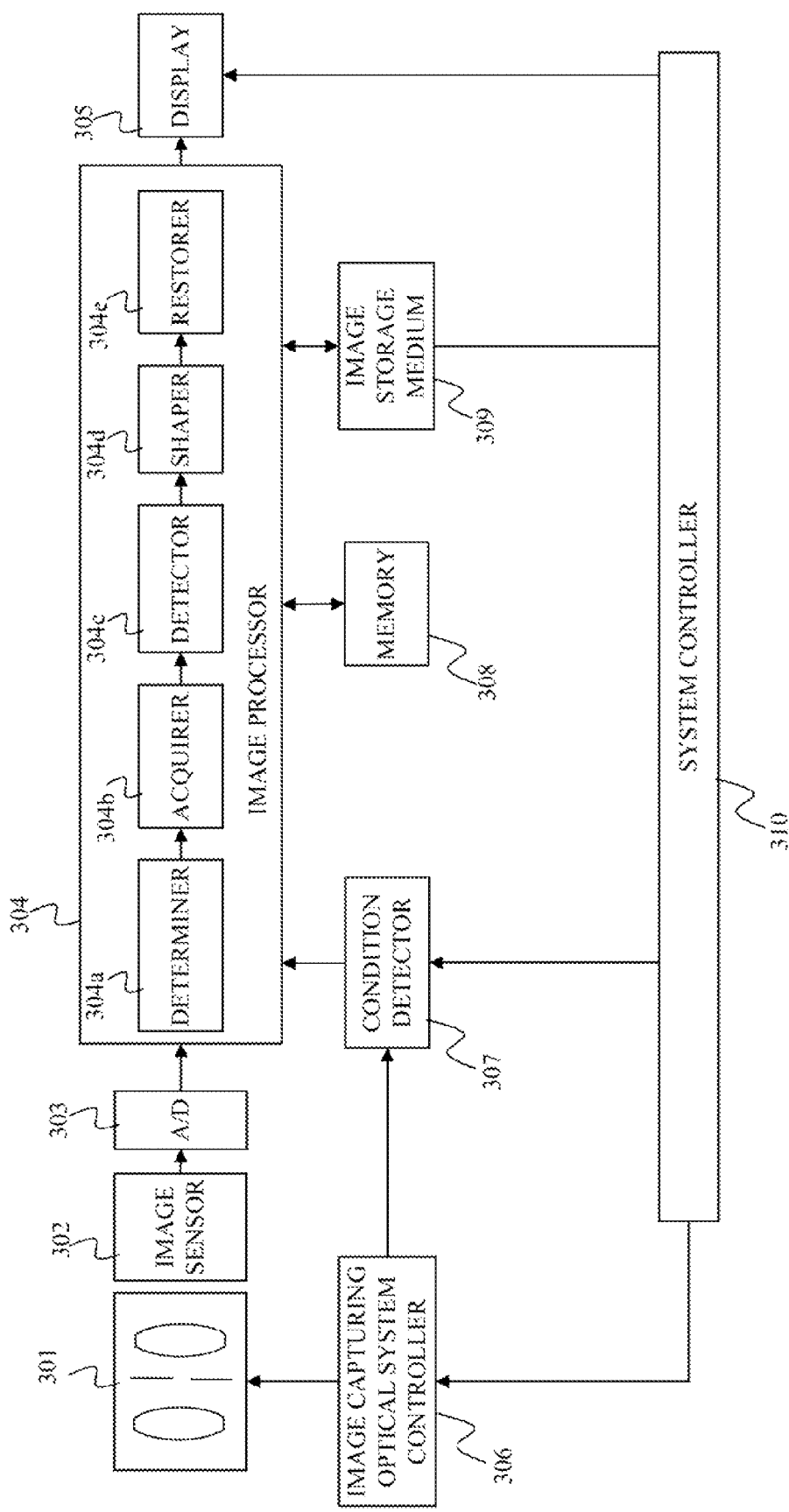
FIG. 19 is a block diagram showing a configuration of the image processing apparatus of Embodiment 3.

FIG. 19 shows a configuration of an image pickup apparatus performing the image process described with reference to FIG. 18. In the image pickup apparatus of this embodiment, components (301 to 303 and 305 to 310) other than an image processor 304 are identical to the components (101 to 103 and 105 to 110) of the image pickup apparatus of Embodiment 1.

A memory 308 sends the specific image pickup condition parameter information to a determiner 304a in the image processor 304. The determiner 304a determines whether or not the actual image pickup condition parameter information received from a condition detector 307 coincides with (or is close in the predetermined range to) the specific image pickup condition parameter information received from the memory 308. An acquirer 304b in the image processor 304 acquires the distance map. When a coincidence determination is made by the determiner 304a, a detector 304c in the image processor 304 performs the uneven blur detection process on an input image. Then, a shaper 304d in the image processor 304 performs the shaping process on the detected uneven blur. Furthermore, a restorer 304e in the image processor 304 performs the image restoration process on the shaped image resulting from the shaping process to output an restored image to an image recording medium 309 or a display device 305.

This embodiment provides the image pickup apparatus as a digital camera including an APS-C image sensor (15.2 mm×22.7 mm) as an image sensor 302. In this embodiment, when the image sensor 302 has a pixel pitch of 4.3 μm and the defocus amount is 0.3 mm, the upper limit of C in condition (1) is 70 pixels.

Tables 1 and 2 list examples of determination of the image pickup conditions.

TABLE 1

Example of Image Pickup Conditions

| f [mm] | 60 | 60 | ... |
| Fno | 2.8 | 2.8 | ... |
| Image Pickup Distance [m] | 3 | 10 | ... |
| Determination Result | ○ | X | ... |

TABLE 2

Example of Image Pickup Conditions

| f [mm] | 60 | 60 | ... |
| Fno | 2.8 | 2.8 | ... |
| Image Pickup Distance [m] | 3 | 3 | ... |
| Defocus Amount [mm] | 0 | 0.15 | ... |
| Determination Result | ○ | X | ... |

Embodiments 1 to 3 each described the case where the image processing apparatus is included in the image pickup apparatus. However, a personal computer installed separately from the image pickup apparatus may be used as the image processing apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-277805, filed on Dec. 20, 2012, which is hereby incorporated by reference herein in its entirety.

What is claimed is:

1. An image processing apparatus comprising:
   a memory configured to store information on a specific image pickup condition under which a specific blur component is generated in an input image produced by image capturing using an optical system, the specific blur component being caused by the optical system;
   an image pickup condition acquirer configured to acquire information on an actual image pickup condition when capturing the input image; and
   a processor configured to perform, when the actual image pickup condition coincides with the specific image pickup condition, a blur detection process to detect the specific blur component included in the input image.

2. An image processing apparatus according to claim 1, wherein the processor is configured to perform the blur detection process in an image region of the input image corresponding to a specific object distance range, the specific object distance range being an object distance range where the specific blur component is generated and obtainable by using the actual image pickup condition.

3. An image processing apparatus according to claim 1, wherein:
   the processor is configured to perform the blur detection process in an image region including C×C pixels in the input image; and
   the following condition is satisfied:

$$1 < C < \text{def}/P$$

where def represents a defocus amount of the optical system, and P represents a pitch of pixels of an image sensor capturing the input image.

4. An image processing apparatus according to claim 1, wherein the specific blur component is a blur component symmetric in a meridional direction connecting a center of the input image and a centroid of the specific blur component, with respect to an axis of symmetry extending in a sagittal direction orthogonal to the meridional direction.

5. An image processing apparatus according to claim 1, wherein the processor is configured to perform the blur detection process in an image region where no edge is detected by using a differential filter in the input image.

6. An image processing apparatus according to claim 1, wherein the processor is configured to perform the blur detection process in an image region around a luminance saturated pixel in the input image.

7. An image processing apparatus according to claim 1, wherein the processor is configured to perform the blur detection process on a highest intensity color component among multiple color components constituting the input image.

8. An image processing apparatus according to claim 1, wherein the specific and actual image pickup conditions each include an F-number and an in-focus object distance.

9. An image processing apparatus according to claim 1, wherein:
the processor is configured to acquire information on an object distance distribution in the input image; and
the specific and actual image pickup conditions each include a defocus amount obtainable from the information on the object distance distribution.

10. An image processing apparatus according to claim 1, wherein the processor is configured to provide data on a shape of the specific blur component and to refer the data in the blur detection process.

11. An image processing apparatus according to claim 10, wherein the processor is configured to provide data on the shape of the specific blur component for each of the specific image pickup conditions different from one another and to refer, in the blur detection process, the data corresponding to the specific image pickup condition coinciding with the actual image pickup condition.

12. An image processing apparatus according to claim 1, wherein the processor is configured to perform a blur correction process to remove or reduce the specific blur component detected by the blur detection process.

13. An image processing apparatus according to claim 12, wherein the processor is configured to perform an image restoration process on a corrected image resulting from the blur correction process performed on the input image.

14. An image pickup apparatus comprising:
an image pickup system configured to perform image capturing using an optical system to produce an input image; and
an image processing apparatus comprising:
a memory configured to store information on a specific image pickup condition under which a specific blur component is generated in the input image, the specific blur component being caused by the optical system;
an image pickup condition acquirer configured to acquire information on an actual image pickup condition when capturing the input image is performed; and
a processor configured to perform, when the actual image pickup condition coincides with the specific image pickup condition, a blur detection process to detect the specific blur component included in the input image.

15. A non-transitory storage medium storing an image processing program that causes a computer to perform an image process, the image process comprising:
acquiring an input image produced by image capturing using an optical system;
providing information on a specific image pickup condition under which a specific blur component is generated in the input image, the specific blur component being caused by the optical system;
acquiring information on an actual image pickup condition when capturing the input image; and
performing, when the actual image pickup condition coincides with the specific image pickup condition, a blur detection process to detect the specific blur component included in the input image.

16. An image processing method comprising:
acquiring an input image produced by image capturing using an optical system;
providing information on a specific image pickup condition under which a specific blur component is generated in the input image, the specific blur component being caused by the optical system;
acquiring information on an actual image pickup condition when capturing the input image; and
performing, when the actual image pickup condition coincides with the specific image pickup condition, a blur detection process to detect the specific blur component included in the input image.

* * * * *